(12) United States Patent
Le Saint et al.

(10) Patent No.: US 9,350,538 B2
(45) Date of Patent: *May 24, 2016

(54) REVOCATION STATUS USING OTHER CREDENTIALS

(71) Applicant: Assa Abloy AB, Stockholm (SE)

(72) Inventors: Eric F. Le Saint, Los Altos, CA (US); Robert S. Dulude, Wellesley, MA (US)

(73) Assignee: Assa Abloy AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/465,891

(22) Filed: Aug. 22, 2014

(65) Prior Publication Data

US 2014/0362994 A1   Dec. 11, 2014

Related U.S. Application Data

(63) Continuation of application No. 13/525,849, filed on Jun. 18, 2012, now Pat. No. 8,848,919.

(60) Provisional application No. 61/498,008, filed on Jun. 17, 2011.

(51) Int. Cl.
| | |
|---|---|
| *H04L 9/00* | (2006.01) |
| *H04L 9/08* | (2006.01) |
| *H04L 9/32* | (2006.01) |
| *H04L 29/06* | (2006.01) |

(52) U.S. Cl.
CPC ............ *H04L 9/0816* (2013.01); *H04L 9/0891* (2013.01); *H04L 9/3234* (2013.01); *H04L 9/3247* (2013.01); *H04L 9/3268* (2013.01); *H04L 63/0853* (2013.01); *H04L 2209/24* (2013.01); *H04L 2209/72* (2013.01)

(58) Field of Classification Search
CPC ... H04L 9/3268; H04L 9/3234; H04L 9/3247; H04L 2209/72; G06F 21/45
USPC .......... 380/277; 713/158, 159, 165, 172, 173, 713/175, 176
See application file for complete search history.

(56) References Cited

U.S. PATENT DOCUMENTS

| | | | | |
|---|---|---|---|---|
| 6,748,531 | B1* | 6/2004 | Epstein | 713/158 |
| 6,763,459 | B1* | 7/2004 | Corella | 713/156 |
| 7,802,293 | B2* | 9/2010 | Boyer et al. | 726/6 |
| 2006/0047950 | A1* | 3/2006 | Thayer | 713/156 |

(Continued)

*Primary Examiner* — Kambiz Zand
*Assistant Examiner* — Tongoc Tran
(74) *Attorney, Agent, or Firm* — Muirhead and Saturnelli, LLC

(57) ABSTRACT

Providing revocation status of at least one associated credential includes providing a primary credential that is at least initially independent of the associated credential, binding the at least one associated credential to the primary credential, and deeming the at least one associated credential to be revoked if the primary credential is revoked. Providing revocation status of at least one associated credential may also include deeming the at least one associated credential to be not revoked if the primary credential is not revoked. Binding may be independent of the contents of the credentials and may be independent of whether any of the credentials authenticate any other ones of the credentials. The at least one associated credential may be provided on an integrated circuit card (ICC). The ICC may be part of a mobile phone or a smart card.

10 Claims, 5 Drawing Sheets

(56) References Cited

U.S. PATENT DOCUMENTS

| | | | |
|---|---|---|---|
| 2006/0101267 A1* | 5/2006 | Takamura et al. | 713/171 |
| 2009/0132813 A1* | 5/2009 | Schibuk | 713/158 |
| 2009/0198618 A1* | 8/2009 | Chan et al. | 705/66 |
| 2010/0287370 A1* | 11/2010 | Gentry et al. | 713/158 |
| 2011/0208961 A1* | 8/2011 | Bushman et al. | 713/156 |
| 2011/0219067 A1* | 9/2011 | Bernosky et al. | 709/203 |
| 2011/0270758 A1* | 11/2011 | Mizani Oskui | 705/44 |
| 2012/0066502 A1* | 3/2012 | Borneman et al. | 713/176 |
| 2012/0124653 A1* | 5/2012 | Aln s et al. | 726/6 |

\* cited by examiner

REVOCATION STATUS USING OTHER CREDENTIALS

CROSS-REFERENCE TO RELATED APPLICATIONS

This application is a continuation of U.S. application Ser. No. 13/525,849 filed Jun. 18, 2012 (now U.S. Pat. No. 8,848,919 issued Sep. 30, 2014), which claims priority to U.S. provisional patent application No. 61/498,008 filed on Jun. 17, 2011, which are incorporated by reference herein.

TECHNICAL FIELD

This application is related to the field of secure communications and, more particularly, to cryptographic key management and the establishment of a protected communication channel between entities.

BACKGROUND OF THE INVENTION

Different types of authentication, such as PKI certificate authentication, may be used for controlling access to organization facilities, computer networks, and/or almost any other secure system. Users desiring access carry personal authentication devices such as contact or contactless smart cards or secure elements of NFC mobile phones, or any device that offers protection of a private key (or similar) corresponding to the authentication. As an example of personal authentication device, FIPS 201 mandates US Federal Agencies to provide their Employees with Personal Identity Verification cards (PIV) for the purpose of controlling access to federal government assets. FIPS 201 compliant PIV cards are equipped with several X.509 PKI certificates for RSA 2048-bit public keys (and other public key certificates, attribute certificates or credentials) and protect the corresponding private keys that are bound to the device. Although PKI key pairs and certificates may be prepared outside the personal authentication device, the private key—and matching public key—may be generated inside the device to ensure its uniqueness and exclusive binding to the device.

A PKI certificate authentication process requires reading the certificate from the personal authentication module, proving ownership of the private key using a challenge response or other key confirmation mechanism, verifying the certificate signature, verifying that the certificate was issued by a trusted issuer, verifying the certificate validity against the expiration date, and determining the revocation status, etc. For X.509 digital certificates, a certificate revocation check may be performed using either a Certificate Revocation List (CRL) or using an OCSP responder, or other method. It is useful to determine the revocation status of a certificate since a revoked certificate may indicate a security breach with respect to the corresponding private key and/or revocation of the privileges/access granted to the certificate holder. For example, if a government employee is issued a PIV card having one or more certificates that expire at a certain date, but the employee leaves his employment prior to that date, it is useful to revoke any certificates or other credentials associated with the PIV card. When the status of a certificate is revoked, the certificate should not be considered valid, and any security process relying on the validity of the certificate should consider the certificate as invalid. Also, a process that determines that a certificate is invalid when the certificate date information is valid and/or any cryptogram associated with the certificate can be verified may infer that the certificate status is revoked.

However, in some cases, determining the revocation status of a particular certificate may be impractical or impossible. For example, in the case of X.509 certificate revocation information, there may be a time delay in connection with propagating revocation information for each and every certificate associated with a user that has changed status and/or associated with an authentication entity that has been compromised. In addition, for some types of authentication mechanisms, there may not be an available or practical revocation mechanism for determining whether the authentication has been revoked. Also, revocation of multiple certificates or other credentials that need to share the same revocation status may be redundant so that multiple revocation status update transactions that are substantially similar need to be executed.

It would be useful to provide a revocation mechanism that can provide timely and accurate revocation status for different types of credentials.

SUMMARY OF THE INVENTION

According to the system described herein, providing revocation status of at least one associated credential includes providing information about a primary credential that is cryptographically independent of the associated credential, binding the at least one associated credential to the primary credential, and deeming the at least one associated credential to be revoked if the primary credential is revoked. Providing revocation status of at least one associated credential may also include deeming the at least one associated credential to be not revoked if the primary credential is not revoked. Binding the at least one associated credential to the primary credential may be independent of the contents of the credentials and may be independent of whether any of the credentials authenticate any other ones of the credentials. The at least one associated credential may be provided on a first integrated circuit card (ICC). The first ICC may be part of a mobile phone or a smart card. The primary credential may be provided on a host that communicates with the first ICC. A host may communicate with the first ICC and the primary credential may be provided external to the host and external to the first ICC. The primary credential may be provided on a second ICC that is separate from the first ICC. A single primary credential may be bound to a plurality of associated credentials so that revocation status of all of the associated credentials varies according to revocation status of the primary credential. The at least one associated credential may be implemented using iClass, Elliptic Curve Cryptography (ECC), X.509, Card Verifiable Certificate, or symmetric key cryptography. The primary credential may be an X.509 digital certificate.

According further to the system described herein, computer software, provided in a non-transitory computer-readable medium, provides revocation status of at least one associated credential. The software includes executable code that accesses information about a primary credential that is cryptographically independent of the associated credential, executable code that binds the at least one associated credential to the primary credential, and executable code that deems the at least one associated credential to be revoked if the primary credential is revoked. The software may also include executable code that deems the at least one associated credential to be not revoked if the primary credential is not revoked. Binding the at least one associated credential to the primary credential may be independent of the contents of the credentials and may be independent of whether any of the credentials authenticate any other ones of the credentials. The at least one associated credential may be provided on a first integrated circuit card (ICC). The first ICC may be part of a mobile phone or a smart card. The primary credential may be provided on a host that communicates with the first ICC. A host may communicate with the first ICC and the primary credential may be provided external to the host and external to the first ICC. The primary credential may be provided on a second ICC that is separate from the first ICC. A single primary credential may be bound to a plurality of associated credentials so that revocation status of all of the associated credentials varies according to revocation status of the primary credential. The at least one associated credential may be implemented using iClass, Elliptic Curve Cryptography (ECC), X.509, Card Verifiable Certificate, or symmetric key cryptography. The primary credential may be an X.509 digital certificate.

BRIEF DESCRIPTION OF THE DRAWINGS

Embodiments of the system described herein are explained with reference to the several figures of the drawings, which are briefly described as follows.

DETAILED DESCRIPTION OF VARIOUS EMBODIMENTS

Figure 1:
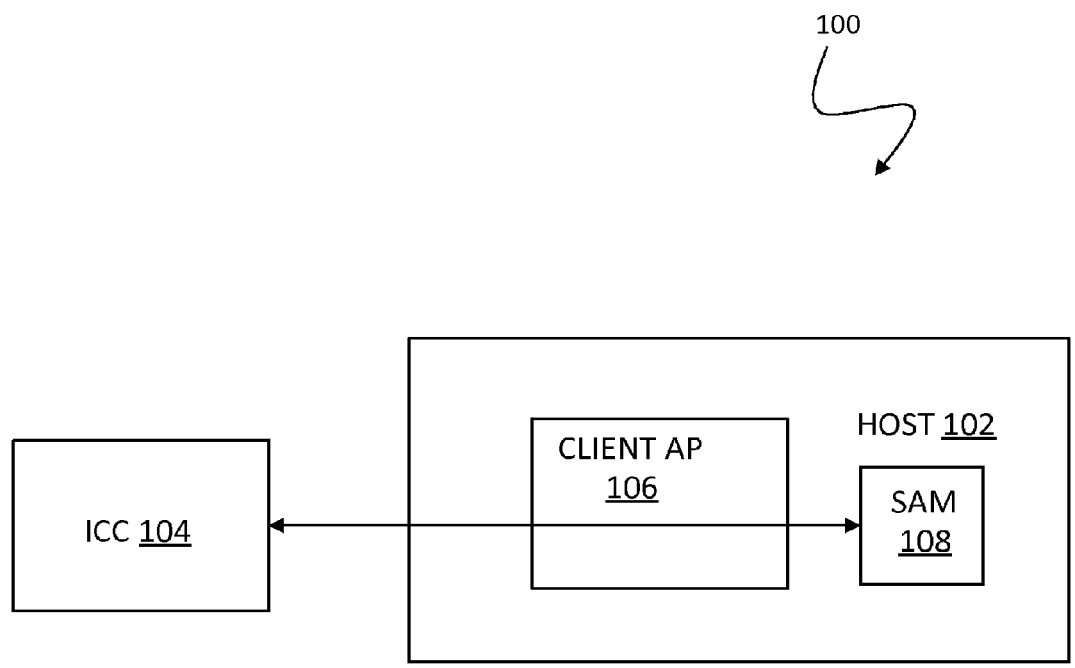
FIG. 1 is a schematic illustration showing an Integrated Circuit Card (ICC) and a host according to an embodiment of the system described herein.

FIG. 1 is a diagram of a system 100 that includes a host 102 in communication with an integrated circuit card (ICC) 104. The host 102 may be a terminal and/or server with protected access. Generally, the host 102 may be any other unit or collection of units capable of establishing a logical communication channel with a device, such as the ICC 104. The host 102 may include a client application 106 and a secure application module (SAM) 108. Although discussed principally herein in connection with use the SAM 108, the system described herein may also operate in connection with devices using a trusted platform module (TPM), hardware security module (HSM) and/or other type of cryptographic module, such as a software module, or a module embedded in a CPU. Furthermore, although the client application 106 is shown and discussed principally herein as a separate component with separate functionality from the SAM 108, in other embodiments, the client application 106 may be incorporated into the SAM 108.

The ICC 104, such provided on a smart card, mobile phone and/or other similar device, communicates with SAM 108 via the host 102 using a contact or contactless interface. The system 100 may provide secure contact or contactless communication between the ICC 104 and the host 102 using any appropriate mechanism to provide protection from attacks that include skimming, sniffing and man-in-the middle attacks and may provide forward secrecy, as further discussed elsewhere herein. The system described herein may operate in compliance with NIST cryptographic mandates, including NIST SP 800-56A or 800-56B (which is incorporated herein by reference), NIST SP 800-57 Part 1, entitled "Recommendation for Key Management" by Elaine Barker et al. (revised, March 2007), which is incorporated herein by reference, and Federal Information Processing Standards (FIPS) 140-2, entitled "Security Requirements for Cryptographic Modules," May 25, 2001, with change notice Dec. 3, 2002, which is incorporated herein by reference. The system 100 may further include the ability to fulfill NSA recommendations on the choice of cryptography (SUITE-B). The system 100 may support full secure messaging for application data or key exchange. It should be noted that other appropriate standards may also be utilized in connection with the system described herein, as would be understood by one of ordinary skill in the art.

Integration specifications for the host 102, the SAM 108, and/or the ICC 104 interfaces may be provided for the system described herein. For the client application 106, the integration may use a single command from the ICC 104 that includes a public key and identification data generated by the SAM 108. A response by the ICC 104 may be directly forwarded to the SAM 108 for processing. The SAM 108 may return authenticated credentials for the ICC 104. Session keys (e.g., symmetric session keys) may be established on both sides.

In an embodiment herein, the client application 106 calls the SAM 108 to generate an ephemeral Elliptical Curve (EC) key pair. The client application 106 then sends an authentication command to the ICC 104, including a public ephemeral key. Then, the client application 106 forwards the authentication response of the ICC 104 as a second authentication command to the SAM 108. If successful, then session keys are established on both sides. The client application 106 builds application protocol data unit (APDU) commands, calls the SAM 108 to wrap (encapsulate) the APDU commands, and then sends the wrapped commands to the ICC 104. In an embodiment, the APDU interface may be an ISO 7816-4 card edge interface.

The system 100 may provide authentication, such as PKI authentication, of a smart card and/or mobile phone with a secure element that may be presented to one or more hosts. The hosts may include one or more hosts that are part of and/or otherwise incorporated into a door or door controller for controlling physical access and into desktops, laptops and/or kiosks for controlling logical access. Use of secure messaging provides an end-to-end protected path for document or transaction decryption and signatures using the secure element or smart card. The end-to-end secure messaging may provide for the transport of PIN or biometrics or physical access control system (PACS) credentials via contactless communication. The system described herein may also be used in connection with PKI-based authentication and ticketing for transit applications. The system described herein may further be used to provide end-to-end post issuance management of the smart card or secure element in a contact or contactless environment.

Note that authentication of the ICC 104 by the host 102 may include receiving authentication information from the ICC 104. The authentication information from the ICC 104 can take any form, including a X.509 PKI digital certificate, an EC digital certificate, or some other appropriate form. In some cases, the authentication information may be embedded by the manufacturer/issuer of the ICC 104 while in other cases the authentication information may be loaded on to the ICC 104 some time after manufacture/issuance. Note that it is also possible to have a combination where some authentication information is provided by the manufacturer/issuer and the information is updated and/or replaced at a following time by new authentication information. It is also possible to have authentication information on the ICC 104 that does not expire.

In some cases, authentication information on the ICC 104 may include an expiration date of the authentication information, after which the ICC 104 is no longer considered valid. For example, an X.509 PKI digital certificate may contain an expiration date. Once the authentication information on the ICC 104 has expired, a user either obtains a new ICC or updates/replaces the authentication information on the ICC 104 with authentication information having a new expiration date.

Sometimes it is desirable to revoke authentication information provided on the ICC 104. For example, if the ICC 104 is an identification/access badge of an employee that leaves a company, the company would like to immediately revoke the ICC 104 so that the ex-employee no longer has company access. This is especially important in instances where the company does not have an opportunity to take physical possession of the badge, such as when an ex-employee is hostile to the company. In some instances, authentication information is provided in a form that provides an effective revocation mechanism, such as X.509 digital certificates. However, in other instances, there may be no straight-forward revocation mechanism.

Figure 2:
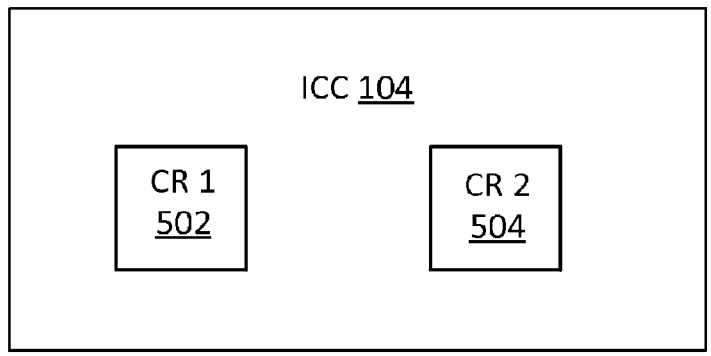
FIG. 2 is a schematic illustration showing an Integrated Circuit Card (ICC) with associated and primary credentials according to an embodiment of the system described herein.

Referring to FIG. 2, the ICC 104 is shown in detail as including an associated credential (CR 1) 502 and a primary credential (CR 2) 504. The associated credential 502 may be used to authenticate the ICC 104 while the primary credential 504 may be used to provide revocation status for the associated credential 502. The credentials 502, 504 may be the same type of credential (e.g., both of the credentials 502, 504 are X.509 digital certificates) or the credentials 502, 504 may be different types of credentials (e.g., the associated credential 502 uses ECC and a Card Verifiable Certificate (CVC) and the primary credential 504 is an X.509 digital certificate).

Although the primary and associate credentials 502, 504 may have many things in common (certificate subject, issuer id, etc.), the credentials 502, 504 are cryptographically independent so that there is no direct or indirect cryptographic relationship between the associated credential 502 and the primary credential 504. Cryptographic independence may be distinguished from current PKI technology (and similar), where credentials may belong to the same certification path (chain) so that the secrets and/or private key associated with one credential are used to form cryptograms that are necessary to establish trust in another credential. Note that cryptographic dependence between two credentials can be direct or indirect. Cryptographic dependence between credentials is direct when a cryptographic operation applies one of the secrets/keys of one of the credentials directly to the other one of the credentials. Cryptographic dependence between credentials is indirect when a cryptographic operation applies one of the secrets/keys of one of the credentials to at least one intermediary credential that applies secrets/keys thereof directly to the other one of the credentials.

The credentials 502, 504 being cryptographically independent means that no secrets and/or private key associated with one of the credentials 502, 504 is used to form cryptograms, directly or indirectly, that are necessary to establish trust in the other one of the credentials 502, 504. Thus, without more (e.g., binding the credentials 502, 504, discussed in detail elsewhere herein), a change in revocation status of one of the credentials 502, 504 does not automatically change the revocation status of the other one of the credentials 502, 504. This is in contrast with a cryptographically dependent PKI certificate chain, where if a credential higher in the chain is revoked, then a certificate lower in the chain is automatically revoked too.

Following creation of the credentials 502, 504, there is a binding so that the revocation state of the associated credential 502 is tied to the revocation state of the primary credential 504 where the associated credential 502 is deemed revoked if the primary credential 504 is revoked. In some cases, the associated credential 502 is deemed not revoked if the primary credential is not revoked while in other cases the associated credential 502 may be revoked independently of the revocation state of the primary credential 504. Under such a system, the associated credential 502, which authenticates the ICC 104, can use any type of authentication mechanism, including a non-revocable authentication mechanism.

As an example of using different types of credentials, the ICC 104 may be used for opening a door for the holder of the ICC 104. The associated credential 502 may be implemented using ECC and CVC to facilitate rapid processing when the user presents the ICC to the door controller (i.e., the host 102). The primary credential 504 may be an X.509 certificate. When the ICC 104 provides authentication to the host 102, the host 102 can confirm the associated credential 502 to determine whether to open the door and, in parallel, can check the revocation status of the primary credential 504 using conventional X.509 certificate revocation data (i.e., CRL information, OCSP response, etc.). If the primary credential 504 is revoked, then the associated credential 502 is deemed revoked. Thus, even if the ICC 104 is properly authenticated using the associated credential 502 which itself is not revoked, the door controller (host 102) does not open the door if the primary credential 504 has been revoked. Accordingly, the system described herein may provide for effective revocation of otherwise non-revocable credentials. Note also that, even in instances where the associated credential 502 is revocable, it may still be advantageous to use the primary credential 504 as a surrogate for the revocation status of the associated credential 502.

Any appropriate mechanism may be used to bind the cryptographically independent credentials 502, 504. Thus, the binding may be provided by a data structure that relates the two credentials and/or some other data provided that is accessible to any entities that rely on the binding and/or that modify the binding. For example, the binding mechanism may be an indication at the host 102 that associated credential 502 is deemed to be revoked if the primary credential 504 is revoked. For a first alternative, binding the associated credential 502 to the primary credential 504 may be done by including a reference to the primary credential 504 within the information for the associated credential 502 at the time of issuance of the associated credential 502. For a second alternative, the binding may be performed by including the same user or unique device identifier in both of the credentials 502, 504 at the time of issuance of the credentials 502, 504. For either alternative, upon presentation of the associated credential 502, the host 102 may read the reference to the primary credential 504 from the associated credential and searches for the revocation status of the primary credential 504 via a CRL, OCSP or other method.

For another alternative, the binding may be independent of the contents of the credentials 502, 504 and may be independent of whether any of the credentials 502, 504 authenticate any other ones of the credentials 502, 504. Thus, there may be no binding information provided with the contents of either of the credentials 502, 504. For instance, an access control system may determine the binding between the associated credential 502 and the primary credential 504 at registration time, when the same person can prove ownership of both of the credentials 502, 504

Testing the revocation status of the primary credential 504 may include also authenticating the primary credential 504, where, if the primary credential 504 cannot be authenticated, the primary credential 504 is deemed revoked. Note also that, in some cases, the ICC 104 may simply identify an authenticable credential stored in a location outside the ICC 104. For example, the ICC 104 could simply identify a serial number of an X.509 digital certificate (primary credential), which can be checked against a CRL for revocation status.

Figure 3:
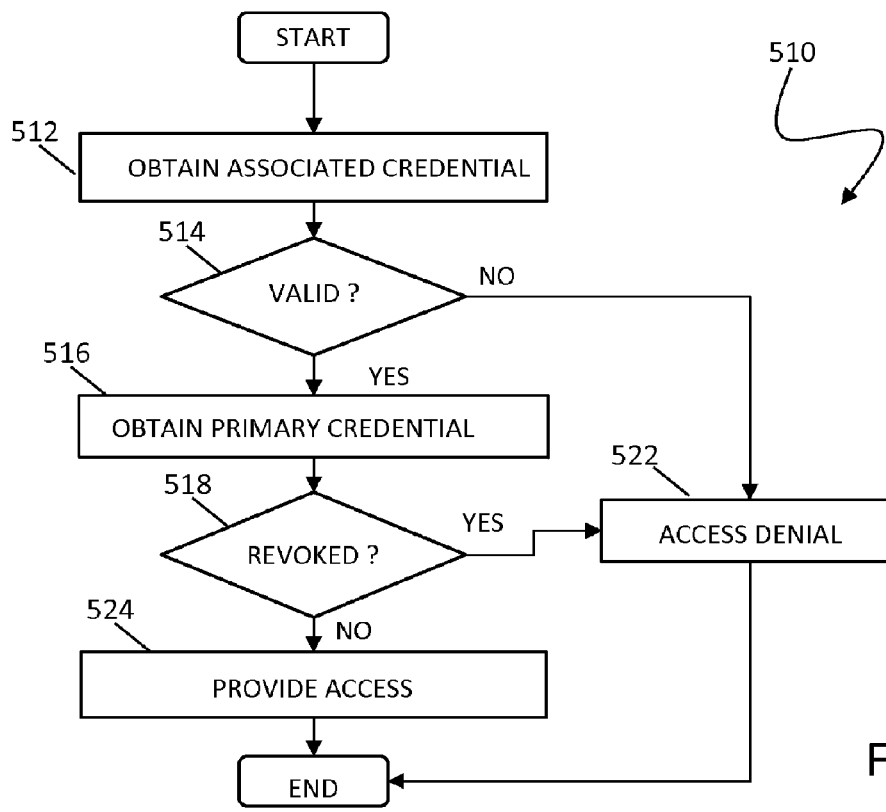
FIG. 3 is a flow diagram showing processing in connection with authenticating and determining revocation status of an associated credential accord according to an embodiment of the system described herein.

Referring to FIG. 3, a flow chart 510 illustrates in detail processing performed by the host 102 in connection with authenticating the ICC 104 when the ICC 104 uses associated and primary credentials 502, 504. Processing begins at a first step 512 where the host 102 obtains the associated credential 502 (e.g., from the ICC 104). Following the step 512 is a test step 514 where it is determined if the associated credential 502 is valid. The test at the step 514 determines if the associated credential 502 is revoked and whether the associated credential 502 properly authenticates the ICC 104. Note that the associated credential 502 may use any appropriate authentication mechanism and/or revocation mechanism. In some cases, the associated credential 502 may use a non-revocable authentication mechanism, in which case the test at the step 514 determines authentication of the associated credential 502 but not revocation status.

If it is determined at the test step 514 that the associated credential 502 is valid (properly authenticates the ICC 104 and is not revoked), then control passes from the test step 514 to a step 516 where the host 102 obtains the primary credential 504 from the ICC 104. Following the step 516 is a test step 518 where it is determined if the primary credential 504 is revoked. As discussed elsewhere herein, in some cases, prior to determining the revocation status of the primary credential 504, it may be useful to first authenticate the primary credential 504. Thus, in some cases, the test step 518 may represent a combined authentication/revocation test of the primary credential 504.

If it is determined at the test step 518 that the primary credential is revoked, then control passes from the test step 518 to a step 522 where access denial processing is performed, as discussed elsewhere herein. Following the step 522, processing is complete. Note that the step 522 is also reached from the step 514 if the associated credential is not valid (i.e., is revoked or does not authenticate the ICC 104). Thus, the primary credential 504 is a surrogate for the associated credential 502 in that, if the primary credential 504 is revoked, access is denied just as if the associated credential 502 had been revoked, irrespective of the revocation status of the associated credential 502 and even irrespective of whether the associated credential 502 is revocable at all. If it is determined at the test step 518 that the primary credential is not revoked, then control passes from the test step 518 to a step 524 where access is allowed. Following the step 524, processing is complete.

Note that, although the associated credential 502 is deemed revoked if the primary credential 504 is revoked, the reverse may not necessarily be true. That is, in some embodiments, the associated credential 502 may be revoked independently of the revocation status of the primary credential 504 so that the associated credential 502 is revoked but the primary credential 504 is not. In other embodiments, such as embodiments where the associated credential 502 is irrevocable, the revocation state of the associated credential 502 tracks the revocation state of the primary credential 504.

Figure 4:
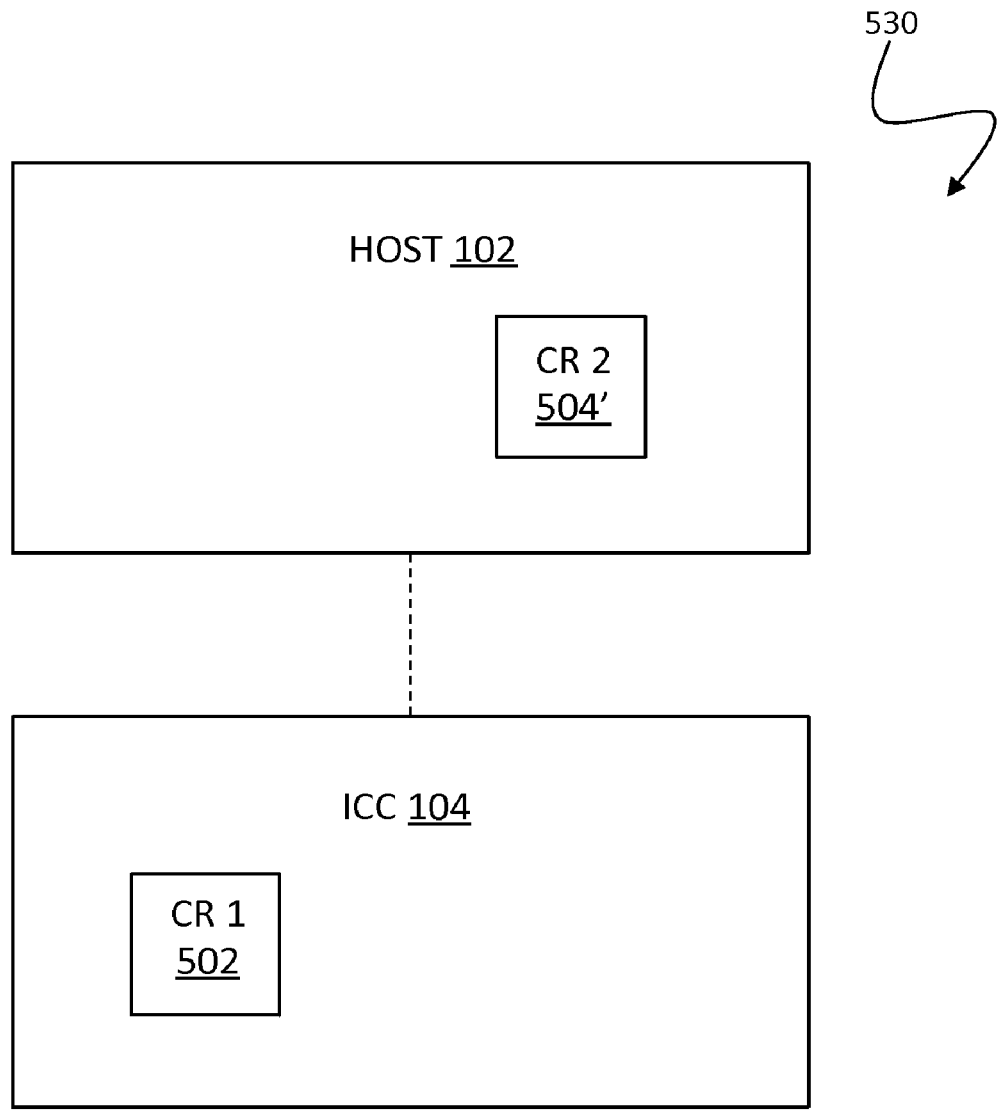
FIG. 4 is a schematic illustration showing an Integrated Circuit Card (ICC) with an associated credential and a host with a primary credential according to an embodiment of the system described herein.

Referring to FIG. 4, a diagram 530 illustrates an alternative configuration in which the associated credential 502 is provided with the ICC 104, but a primary credential 504' is stored on the host 102. The primary credential 504' is used just like the primary credential 504 described elsewhere herein, except that, instead of being stored on the ICC 104, the primary credential 504' is provided on the host 102. Thus, for the configuration illustrated by the diagram 530, it is not necessary for the host 102 to obtain the primary credential 504' from the ICC 104. The primary credential 504' may be provided to the host 102 from any number of sources, including an initial transfer from the ICC 104, a secure transfer over the Internet from a remote host (not shown), a user inserting a USB drive or a disk (containing the primary credential 504') into a reader at the host 102, etc.

Figure 5:
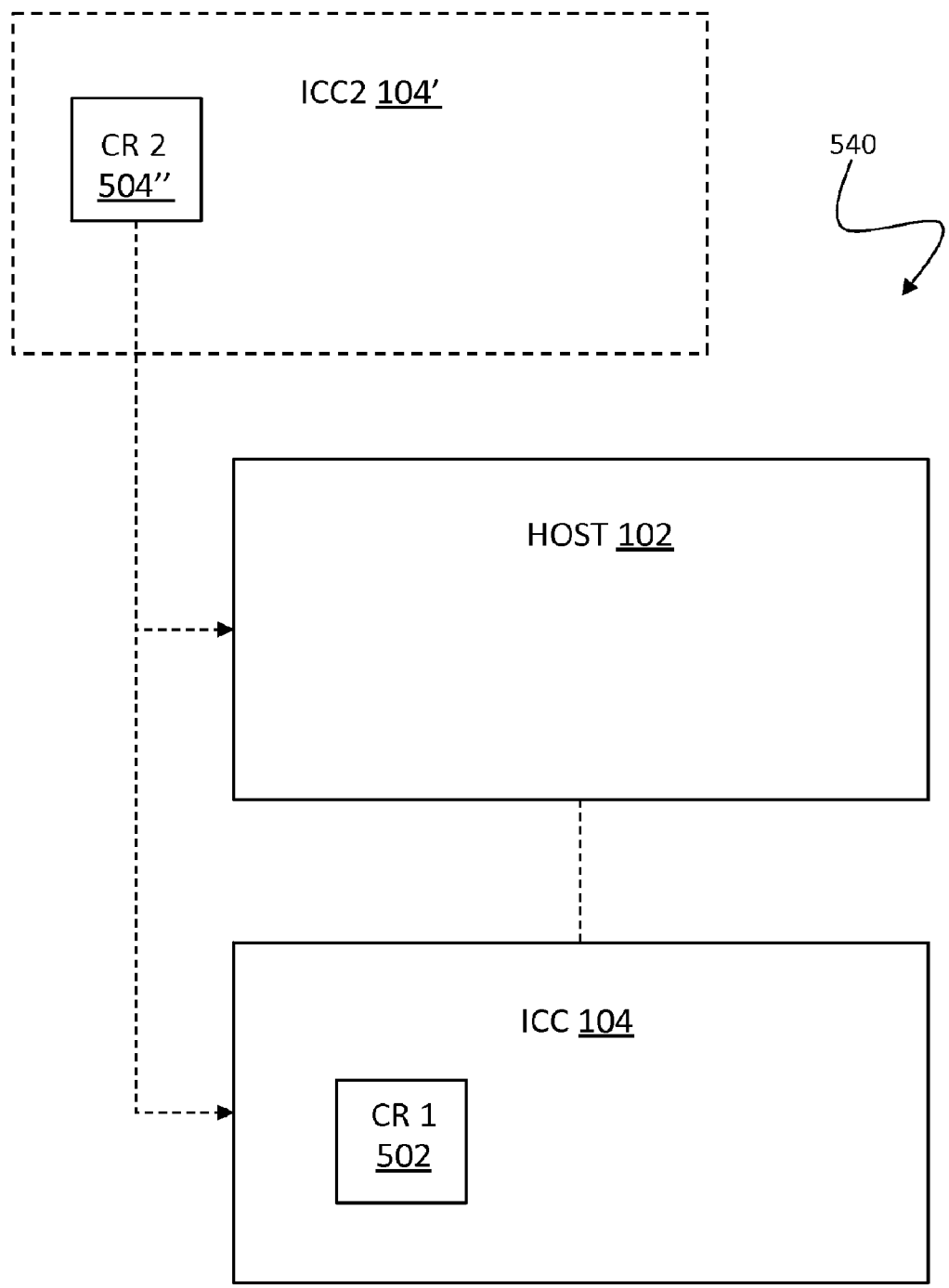
FIG. 5 is a schematic illustration showing an Integrated Circuit Card (ICC) with an associated credential and a host where a primary credential is provided outside the ICC and the host according to an embodiment of the system described herein.

Referring to FIG. 5, a diagram 540 illustrates an alternative configuration in which the associated credential 502 is provided with the ICC 104, but a primary credential 504" is stored outside both the host 102 and the ICC 104. The primary credential 504" is used just like the primary credential 504 and the primary credential 504' described elsewhere herein, except that, instead of being stored on either the host 102 or the ICC 104, the primary credential 504" is provided external to both. Thus, for the configuration illustrated by the diagram 540, the host 102 obtains the primary credential 504" from a source other than the ICC 104, such as from a remote host (not shown) that transfers the primary credential 504" using a secure channel. The transfer may be over the Internet or by some other medium. In some embodiments, the primary credential 504" may be provided on a second ICC 104' that is separate from the ICC 104 that contains the associated credential 502.

In some embodiments, it may be the responsibility of the entity relying on the revocation status (e.g., the host 102) to locate the primary credential 504". If the primary credential 504" is transferred to the ICC 104, then the system may operate like that illustrated in FIG. 2 and described above. Alternatively, if the primary credential 504" is transferred to the host 102, then the system may operate like that illustrated in FIG. 4 and described above. In some embodiments, it is not necessary to provide the primary credential 504" itself, but only information about the primary credential 504" (e.g., serial number) so that the revocation status of the primary credential 504" can be checked.

As an example of the system illustrated in FIG. 5, the ICC 104 may correspond to a cell phone issued to a user. The host 102 may correspond to a door controller that opens a secure door. The associated credential 502 is stored in the cell phone that the user presents to the host 102 to open the door. The user may also have a PIV card that corresponds to the second ICC 104' and that contains the primary credential 504". So long as the primary credential 504" is not revoked, the user can open the door using the associated credential 502 on the ICC 104 (cell phone). However, if the host 102 detects that the primary credential 504" has been revoked (e.g., the PIV card 104' is no longer valid), then the host 102 deems the associated credential 502 to also be revoked so that the ICC 104 (cell phone) can no longer be used to open the secure door. If the cell phone (ICC 104) is lost or stolen, but the PIV (second ICC card 104') is not, it may be possible to revoke the associated credential 502, but not the primary credential 504". Thus, revocation of the primary credential 504" guarantees revocation of the associated credential 502, but non-revocation of the primary credential 504" does not guarantee non-revocation of the associated credential 502.

Figure 6:
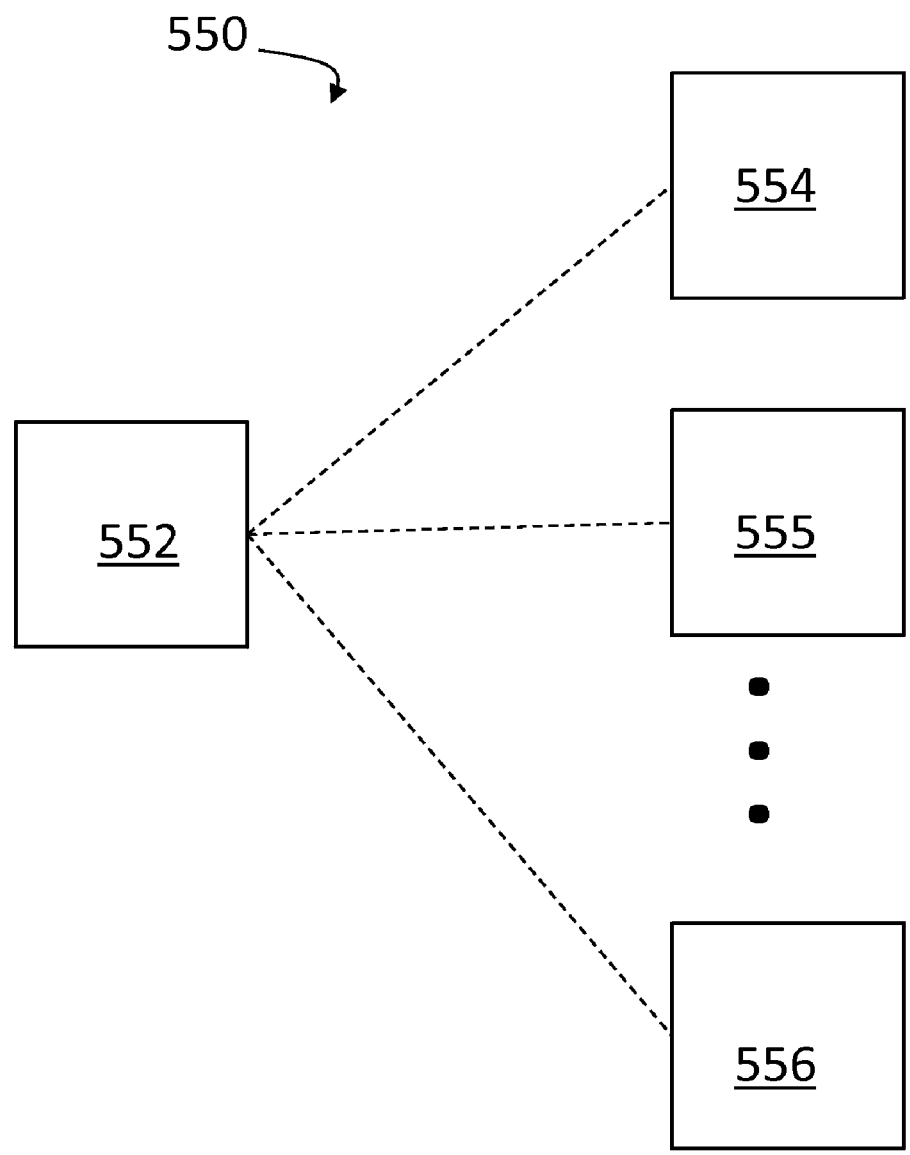
FIG. 6 is a schematic illustration showing a primary credential and a plurality of associated credentials according to an embodiment of the system described herein.

Referring to FIG. 6, a diagram 550 illustrates a primary credential 552 being bound to a plurality of associated credentials 554-556. Revocation status of all of the associated credentials 554-556 varies according to the revocation status of the primary credential 552. Thus, if the primary credential 552 is revoked, all of the associated credentials 554-556 are deemed revoked. One use of a system like that illustrated by the diagram 550 is a situation where each of the associated credentials 554-556 relates to a separate device that a user is issued as an employee of a company (e.g., cell phone, parking pass, access card, etc.) and the revocation state of the primary credential 552 corresponds to the user's employment status with the company. If the user leaves the company, the primary credential 552 is revoked, thus causing all of the associated credentials 554-556 to be effectively revoked.

In some embodiments, the primary credential may contain a pointer or other identifier that indicates the associated credential(s). It is also possible for the associated credential(s) to contain pointer(s) or other identifier(s) that indicates the primary credential. In other embodiments, none of the primary credential or the associated credential(s) contain any indication of the others. It is also possible for one or more of the associated credentials to have the same or a similar identifier as the primary credential. In other embodiments, the identifiers may be independent. One or more of the associated and primary credentials may be authenticated, at least partially, by another one of the associated and primary credentials. Note that the system described herein may be used in instances where the associated credential is not revocable (and/or not easily revocable), but it is still desirable to provide an expiration of the ICC 104 after a predetermined amount of time (e.g., one year) by revoking the primary credential.

An example of the system described herein is to use Elliptic curve authentication keys or symmetric device authentication keys on a PIV card to accelerate contactless PKI authentication at a door. A key pair and a Card Verifiable Certificate (CVC) may be used as a primary credential to authenticate the personal authentication device. The primary credential may be located on the same device as the PIV card, but may be logically separated from the PIV application, and provide a different level of trust. A secure channel session key established from the CVC authentication may be used to authenticate a reference to a PIV certificate that is encrypted with the session key. Accordingly, the PIV certificate reference is bound to the session keys and the static key and CVC. Since the reference to the PIV certificate is trusted to be bound to the keys and the device, the verification process at the door controller may verify the PIV certificate revocation status and additional attributes such as its expiration date to determine if the device being presented is valid.

Another example is a primary credential that is located on a device distinct from the device holding the primary PKI certificate. An embedded secure element of a mobile phone may use iClass keys for authentication that are bound to the primary PIV credential stored in the original separate PIV card of the device owner. The mobile phone may be used to access a mass transit system using the iClass keys. Using the process described herein, the mobile phone provides the identifier of the primary PIV card certificate, authenticated from the iClass keys. The primary PIV certificate status may be retrieved and used at the door controller to determine if the mobile phone can be considered a valid device.

The system described herein may be used with any authentication/validation technique or combination of techniques. Various embodiments discussed herein may be combined with each other in appropriate combinations in connection with the system described herein. Additionally, in some instances, the order of steps in the flowcharts or flow diagrams may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only.

The invention claimed is:

1. A system for providing door access, comprising:
an integrated circuit card having at least one associated credential that uses a non-revocable authentication mechanism; and
a host that communicates with the integrated circuit card and controls physical access through a door in response to receiving the associated credential from the integrated circuit card, wherein a primary credential is bound to the associated credential and is cryptographically independent of the associated credential and wherein the at least one associated credential is deemed to be revoked if the primary credential is revoked.

2. A system, according to claim 1, wherein the at least one associated credential is deemed to be not revoked if the primary credential is not revoked.

3. A system, according to claim 1, wherein the at least one associated credential is bound to the primary credential independently of the contents of the credentials and independently of whether any of the credentials authenticate any other ones of the credentials.

4. A system, according to claim 1, wherein the integrated circuit card is part of one of: a mobile phone and a smart card.

5. A system, according to claim 1, wherein the primary credential is provided on the host.

6. A system, according to claim 1, wherein the primary credential is provided external to the host and external to integrated circuit card.

7. A system, according to claim 1, wherein the primary credential is bound to additional associated credentials separate from the associated credential.

8. A system, according to claim 1, wherein the at least one associated credential is implemented using Elliptic Curve Cryptography (ECC).

9. A system, according to claim 1, wherein the host includes a client application and a cryptographic module in communication with the client application.

10. A system, according to claim 9, wherein the cryptographic module is one of: a secure application module, a trusted platform module, and a hardware security module.

* * * * *